Nov. 15, 1960 G. E. KEEFER 2,960,555
FURNACE ELECTRODE ASSEMBLY WITH OXIDATION SHIELDING
Filed Dec. 28, 1956 2 Sheets-Sheet 2
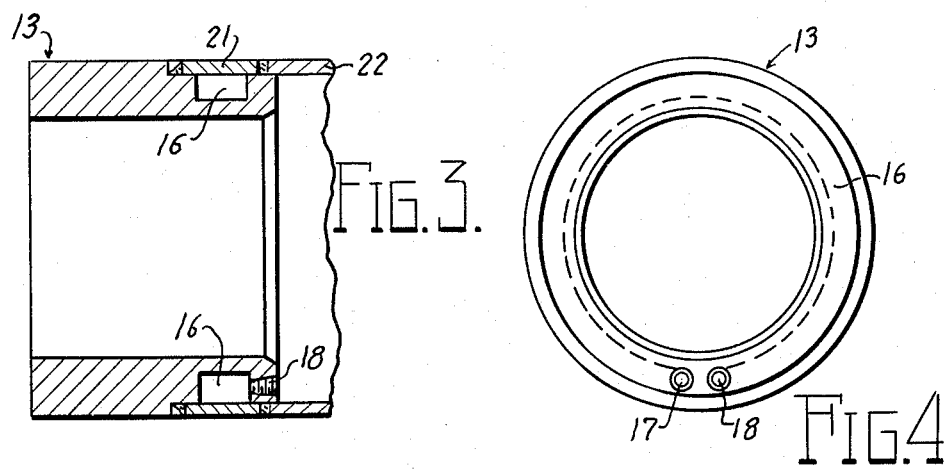
INVENTOR.
George E. Keefer
J. R. Nelson and
Leonard D. Soubier
ATTORNEYS United States Patent Office 2,960,555
Patented Nov. 15, 1960

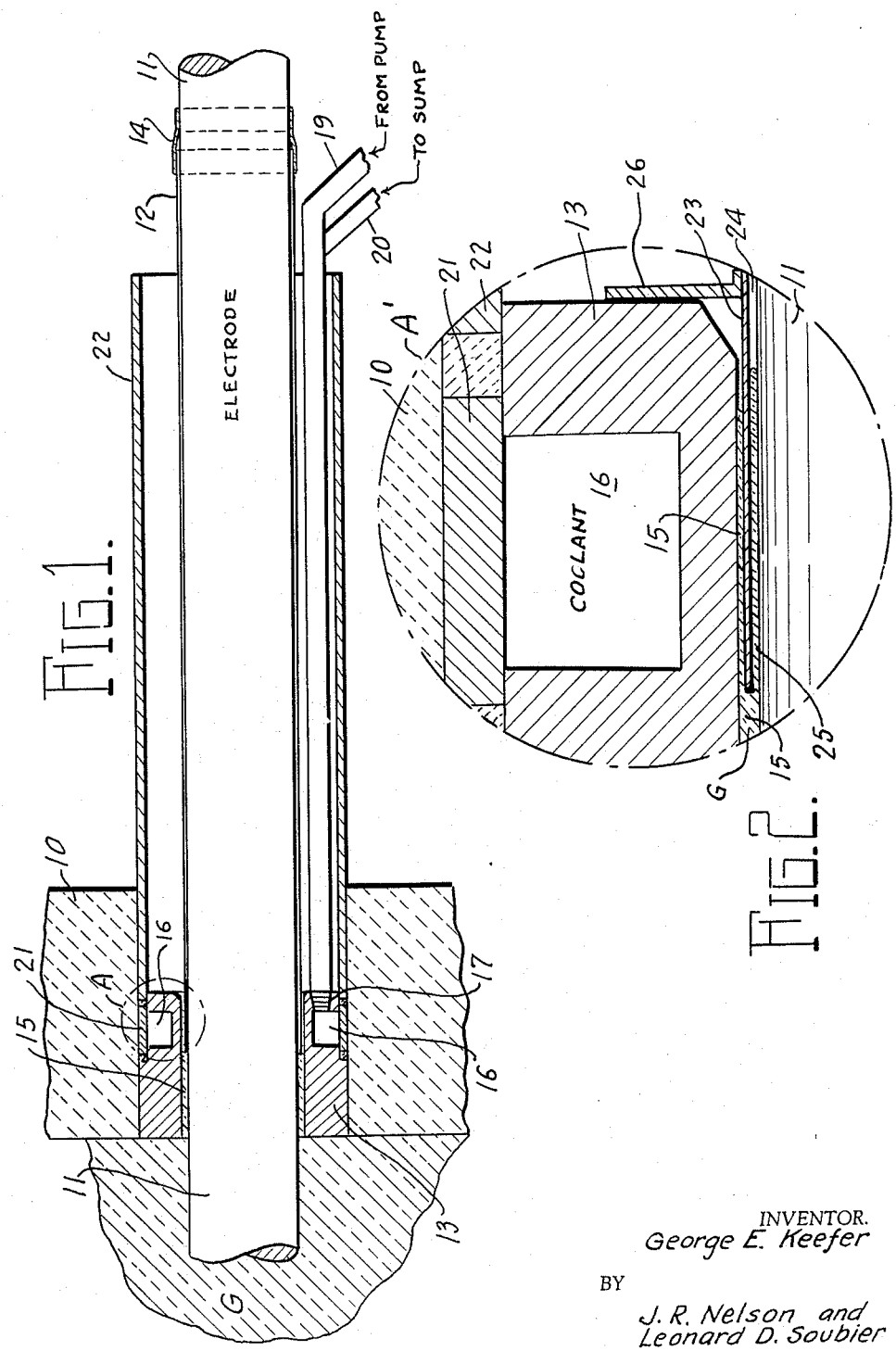

2,960,555

FURNACE ELECTRODE ASSEMBLY, WITH OXIDATION SHIELDING

George E. Keefer, Toledo, Ohio, assignor to Owens-Illinois Glass Company, a corporation of Ohio Filed Dec. 28, 1956, Ser. No. 631,112

10 Claims. (Cl. 13—17)

This invention relates to installation of furnace electrodes in a side or bottom wall aperture of an electric melting furnace, primarily designed for use in melting glass, in which the heating effect on the glass or batch materials in the furnace is secured by the resistance of the material to the passage of current, and more particularly to an electrode installation and method thereof, which installation eliminates oxidation or burn-off damage to the electrode.

Certain electrodes, while very suitable for a desired service in many particulars, have the disadvantage of tending to burn-off or oxidize within the furnace wall through which they extend. At the inner end, the electrode is covered by the molten glass and, therefore, is protected from oxidation, but inside the furnace wall and outwardly therefrom there is no such protection and the electrode operating at elevated temperatures will be seriously damaged by burn-off in a comparatively short time by oxidation promoted by the gradual infiltration of air at the furnace wall joint between the electrode and the wall. The exposure to air thus supplies the oxygen necessary to produce oxidation of the electrode material at the characteristic high temperatures existing at or near the furnace wall.

Electrodes are also water cooled at their furnace wall juncture to cool the electrode portion most susceptible to oxidation below the critical oxidation temperature of the electrode material. One cooling means used, heretofore, has been the continuous discharge of water directly onto the electrode adjacent the outer end of the electrode mounting in the furnace wall, which mounting usually comprises a bushing member mounted in the wall aperture through which the electrode is inserted. The electrode cooling water, after discharge onto the electrode, is not easily controlled and frequently spills onto the refractories, steel structure and walkways around the furnace, damaging the furnace and creating an electric shock hazard to persons coming into that area. Also, as is often the case with these cooling devices, the water discharged onto the electrode evaporates in the electrode holder causing deposits of solids in the cooling system which will gradually close off circulation of the coolant water, and results in accelerated damage to the electrode.

It is, therefore, an object of the present invention to provide an electrode installation wherein the electrode is shielded from oxidation to overcome the burn-off of the electrode in the furnace wall.

Another object of this invention is to provide a totally enclosed electrode cooling means which overcomes the above objections.

Another object of the invention is a method of providing an oxidation shield for the electrode.

Another object of the invention is to provide an electrode installation in the furnace wall that prevents oxygen from entering the joint and causing electrode oxidation at or internally of the furnace wall.

The specific nature of this invention, as well as other objects and advantages thereof, will become apparent to those skilled in the art from the following detailed description, taken in conjunction with the annexed drawings on which, by way of preferred example only, are illustrated several embodiments of this invention.

In the drawings:

Fig. 1 is a longitudinal sectional elevational view of the electrode installation, embodying this invention, in operative position in the wall of a glass furnace.

Fig. 2 is an exploded sectional view A' of encircled portion A of Fig. 1, illustrating a modification of the invention.

Fig. 3 is a longitudinal sectional elevational view through the center of the electrode bushing and shows an enclosed water jacket therein for circulating coolant.

Fig. 4 is a right end elevational view of the bushing in Fig. 3.

In Fig. 1, 10 is one of either the side or bottom walls of a furnace of refractory material, such as clay or fire brick, and G is a body of molten material, such as glass, into which a mounted electrode 11 extends submersed in said material. Electrode 11 is provided with a sheath 12 extending over a portion of the length of electrode 11 and is placed thereon so that the inner end of sheath 12 is received within bushing 13 when electrode 11 is inserted therethrough and placed in its normal operating position.

Sheath 12 is applied to electrode 11 before it is assembled in the furnace wall 10, and, as is shown in this embodiment of the invention, in intimate contact with the electrode 11. Sheath 12 is sealed at each end to prevent oxygen in the air from reaching the electrode. This seal is accomplished in the following manner.

The sheath 12 is preferably applied to electrode 11 before the electrode is installed by slipping a preformed sleeve of material of a size to provide a snug or a press fit onto the body of electrode 11. When sheath 12, in the form of the sleeve, is in place a sealing member 14 is placed over the outer end of the electrode and secured to the sleeve and electrode to make an air-tight seal therebetween. The inner end of sheath 12 is sealed in glass in bushing 13 after assembly, as will hereinafter be described. The sleeve making up sheath 12 can be one of several materials, preferably metallic, which will resist oxidation at elevated temperatures.

After sheath 12 is in place, electrode 11 is installed by inserting its inner end through bushing 13, which is mounted in the aperture of furnace wall 10. The bore of bushing 13 is preferably a loose fit allowing some annular clearance between it and the outer surface of electrode 11. Electrode 11 is inserted to a point where the inner end of sheath 12 is received by bushing 13. The molten glass G about electrode 11, when sufficiently fluid, will enter the annular space 15 between the electrode and bore of bushing 13, and will flow past the inner end of sheath 12 in the annular clearance space provided.

Bushing 13 has an annular chamber 16 intermediate its ends. Inlet and outlet ports 17 and 18, respectively, are tapped through the outer end of bushing 13 to communicate with chamber 16 (Figs. 3 and 4). Conduits 19 and 20 are connected, respectively, to inlet and outlet ports 17 and 18 to supply and exhaust a coolant. Coolant is supplied under pressure to conduit 19 from a pump (not shown) and circulated through chamber 16 (Fig. 1). The coolant is exhausted at port 18 and carried by conduit 20 to a pump or heat exchanger (not shown) for cooling and recirculation through the system. Chamber 16 is totally enclosed and sealed by annular collar 21 welded in place to define the outer diameter of chamber 16 (Fig. 1). Thus, the coolant is circulated in a totally enclosed system and is not applied directly to the electrode, thereby eliminating deposit of solids, damage to the furnace and electric shock hazard to persons in the area. An outer holder sleeve 22 is butt welded at one end in bushing 13 to collar 21 and extends outwardly to provide a protective housing for electrode 11.

Electrode 11 is inserted through bushing 13, as previously stated, and supported at its outer end in operating position by conventional support member (not shown) connected to the furnace structure. The electrode 11 has an operative connection at its outer end (not shown) to an electrical circuit for supplying energy. Molten glass G will flow into annular space 15 between the electrode 11 and bushing 13 and between sheath 12 and bushing 13. Coolant is then circulated through chamber 16 to remove heat from the interior portions of bushing 13 and from the molten glass entrant adjacent thereto. The loss of temperature of the glass occupying space 15 causes it to freeze, first between sheath 12 and bushing 13, since it is thinner in cross section, and then between bushing 13 and electrode 11. The glass forms an air-tight seal between the inner end of sheath 12 and electrode 11, and when it is cooled sufficient to solidify in annular space 15 it forms a seal to prevent any leakage of molten glass from the furnace at the electrode joint.

The effect of cooling the internal portions of bushing 13 by circulation of coolant through chamber 16 performs four advantageous functions for the electrode mounting, namely: (1) It serves as a convenient and efficient means of sealing the inner end of sheath 12, as mentioned, to prevent air and its harmful oxygen ingredient from reaching the electrode at any vulnerable point along the electrode where the temperature thereof may be sufficient to cause damaging oxidation of the electrode, (2) it prevents molten glass from leaking out around the electrode or the bushing by freezing it in any accessible passageway, (3) it retards wear of the refractories adjacent the bushing by lowering the operating temperature at the adjacent supporting portions of the refractory defining the furnace wall aperture in which the bushing is mounted, and (4) it provides a stable end support for the electrode in the bushing.

This invention contemplates applying the sheath 12 to electrode 11 in other forms than the aforementioned snugly fit sleeve. The same air-tight sheath 12 may be provided on electrode 11 by plating a longitudinal portion of the electrode with a metal, examples of which are chrome, nickel or silver plating applied directly to the electrode over the desired portion. Another variant for applying sheath 12 is spraying a coating of metallic material having properties of high oxidation resistance directly to a longitudinal portion of electrode 11. Examples of such metallic materials are compositions of Al—Cr—Si, Cr—Mo—Si, Mo—Ni—Si, Fe—Si, Ni—Si, and Colmonoy No. 5 or No. 6, the mentioned Colmonoys having chemical properties as follows:

Colmonoy No. 5:
    Ni _____percent__ 71–81
    Cr _____do____ 10–17
    B _____do____ 2–4
    Fe—Si—C _____do____ 9 (max.)
    Melting point _____° F__ 1950

Colmonoy No. 6:
    Ni _____percent__ 65–75
    Cr _____do____ 13–20
    B _____do____ 2¾–4¾
    Fe—Si—C _____do____ 10 (max.)
    Melting point _____° F__ 1950

Where the sheath 12 is applied to the electrode by either of the last-mentioned modified steps of the method by plating or spraying, the outer end seal 14, previously described, would be unnecessary, since either of these said types of applying the sheath would form its own air-tight seal at either end thereof and prevent air from contacting the electrode where applied.

A still further modification of this invention is illustrated in Fig. 2, wherein an enlarged hollow sheath 23 is fitted over a longitudinal portion of electrode 11, and when fitted thereover defines an annular space 24 between its interior surface and the exterior surface of electrode 11. The spaced sheath 23 may be of any gas impermeable oxidation-resistant material, preferably a metallic material. The electrode 11 and assembled sheath 23 are inserted into bushing 13. In assembled position, electrode 11 extends through bushing 13, and the inner end of sheath 23 extends into bushing 13. A retaining lug 26, which is integral with sheath 23, engages the outer end of bushing 13. Lug 26 stops sheath 23 in its proper assembled position and serves as a holding means to permit sliding electrode 11 relative to sheath 23, so that, as the inner end of electrode 11 is consumed during use, it may be repositioned in the glass by sliding it into the furnace a sufficient amount while sheath 23 is held in its same position by lug 26. After electrode 11 and sheath 23 are thus installed, current is applied to electrode 11 to melt glass G. When glass G is at the proper viscosity, it will flow into annular space 15 between the bore of bushing 13 and electrode 11, part of which will flow into the inner end of annular space 24 between electrode 11 and sheath 23. Coolant is circulated through chamber 16, as previously described, and the temperature of the glass in the bushing joint solidifies to form a glass seal 25 between the inner end portion of sheath 23 and electrode 11.

A sealing member 14, such as shown in Fig. 1, is fitted over electrode 11 and sealed to the outer end of sheath 23 to make a fluid-tight seal thereat. Since this end of the electrode is operated at much lower temperatures due to its spacing outwardly of the furnace wall, any convenient form of seal may be utilized. An inert gas may be forced into annular space 24 before sealing member 14 is finally secured, thereby purging the air from annular space 24. The inert gas may be kept under a positive pressure and then sealing member 14 finally closed to retain annular space 24 filled with said gas under some amount of positive pressure to insure against infiltration of air therein. Another variant to this form of the invention just described (Fig. 2) is to omit filling the annular space 24 with inert gas and seal the outer end of sheath 23 to electrode 11 by sealing member 14 so as to entrap air in annular space 24 after the glass seal 25 is formed at its inner end. The very small quantity of oxygen in this small volume of entrapped air will react with electrode 11 at elevated temperatures to consume this oxygen and leave annular space 24 filled with a gas that will not react further with the electrode. The small amount of oxidation occurring to achieve this will be negligible and will not harm the electrode appreciably. By way of example, if the electrode is a carbon composition (graphite) or molybdenum, this small amount of oxygen in the air entrapped in annular space 24 will react at appropriate elevated temperatures to form oxides of either carbon or molybdenum. Neither of these gases will attack the electrode further.

It will, of course, be understood that various details of construction of the apparatus may be modified through a wide range without departing from the principles of this invention, and it is, therefore, not the purpose to limit the patent granted hereon otherwise than necessitated by the scope of the appended claims.

I claim:

1. An electrode assembly for mounting an electrode in an aperture in a glass furnace wall below the normal level of the molten glass therein contained comprising a bushing mounted in said aperture, an electrode extending through said bushing, an annular coolant chamber intermediate the ends of said bushing and within said wall aperture, means connected to said annular chamber for circulating a supply of coolant therethrough, an annular metallic sheath extending over a longitudinal portion of the electrode, the inner end of said sheath terminating in said bushing, and a fluid-tight seal formed by glass solidified between said sheath and said bushing, said seal encompassing said inner end of the sheath.

2. Apparatus defined in claim 1, wherein said sheath is in intimate contact with the electrode.

3. Apparatus defined in claim 1, wherein said sheath is annularly spaced from said electrode.

4. Apparatus defined in claim 3, wherein the annular space between said sheath and the electrode is sealed at the bushing enclosed end of said sheath by glass from the furnace, said glass being solidified therein.

5. Apparatus defined in claim 4, wherein the outer end of the sheath has an annular fluid-tight seal between it and the electrode.

6. Apparatus defined in claim 5, wherein the annular space between said electrode and said sheath is filled with a gas under positive pressure.

7. An electrode assembly for mounting an electrode in an aperture in a glass furnace wall below the normal level of the molten glass therein contained comprising a bushing mounted in said aperture, an electrode extending through said bushing, an annular coolant chamber intermediate the ends of said bushing, means connected to said annular chamber for circulating a supply of coolant therethrough, a gas impervious metallic sleeve jacketing a longitudinal portion of the electrode, said metallic sleeve being annularly spaced from said electrode and sealed at its outer end with respect to said electrode by fluid-tight sealing means and sealed at its inner end in glass, the inner end of said sleeve positioned to terminate in said bushing, and a non-oxidizing gas filling said sealed annular space between the sleeve and the electrode, said gas being under a positive pressure.

8. An electrode assembly for mounting an electrode in an aperture in a glass furnace wall below the normal level of the molten glass therein contained comprising a bushing mounted in said aperture, an electrode extending through said bushing, an annular coolant chamber intermediate the ends of said bushing, means connected to said annular chamber for circulating a supply of coolant therethrough, a gas impervious sleeve annularly spaced in enclosing relationship to a longitudinal portion of the electrode, the inner end of said sleeve being positioned to terminate in said bushing at an operating position, means carried on said sleeve constructed and arranged for defining said operating position of the latter, whereby said electrode may be shifted inwardly relative to said sleeve while said sleeve is held stationary in said operating position with respect to said bushing, and sealing means for providing an airtight seal between the outer end of said sleeve and the electrode.

9. An electrode assembly for mounting an electrode in an aperture in a wall of a glass furnace chamber in position to contact molten glass therein comprising an annular bushing mounted in said wall aperture, said bushing having inner and outer annular walls, said inner wall defining an opening, an electrode extending through said opening, the electrode being spaced from said inner wall of the bushing, an enclosed annular coolant chamber in said bushing between said inner and outer walls and intermediate the ends of the bushing, said chamber being disposed in said wall aperture, means connected to said annular chamber for circulating a supply of coolant through the chamber, and an annular sheath extending over a longitudinal portion of the electrode, said sheath extending into said opening of the bushing, a fluid-tight annular seal being formed by glass entering between said sheath and the inner wall of the bushing and cooled by the influence of said circulated coolant.

10. The sub-combination of an improved electrode for mounting in a wall aperture of a glass furnace chamber comprising an elongated electrode member, an annular sheath member of a gas impermeable oxidation-resistant material, said sheath being disposed to encompass the electrode member along a longitudinal portion thereof, the sheath being retained in an annularly spaced relationship to the electrode body and one end of said sheath extending into said wall aperture, a sealing member at the end of the sheath outermost from said wall aperture forming an air-tight seal thereat between the sheath member and the electrode member, and a gas under positive pressure in the annular space between the electrode and sheath.

References Cited in the file of this patent

UNITED STATES PATENTS

| | | |
|---|---|---|
| 2,636,914 | Arbeit | Apr. 28, 1953 |
| 2,798,892 | Penberthy | July 9, 1957 |
| 2,904,609 | Schjelderup et al. | Sept. 15, 1959 |

FOREIGN PATENTS

| | | |
|---|---|---|
| 692,442 | Great Britain | June 3, 1953 |